2,670,824

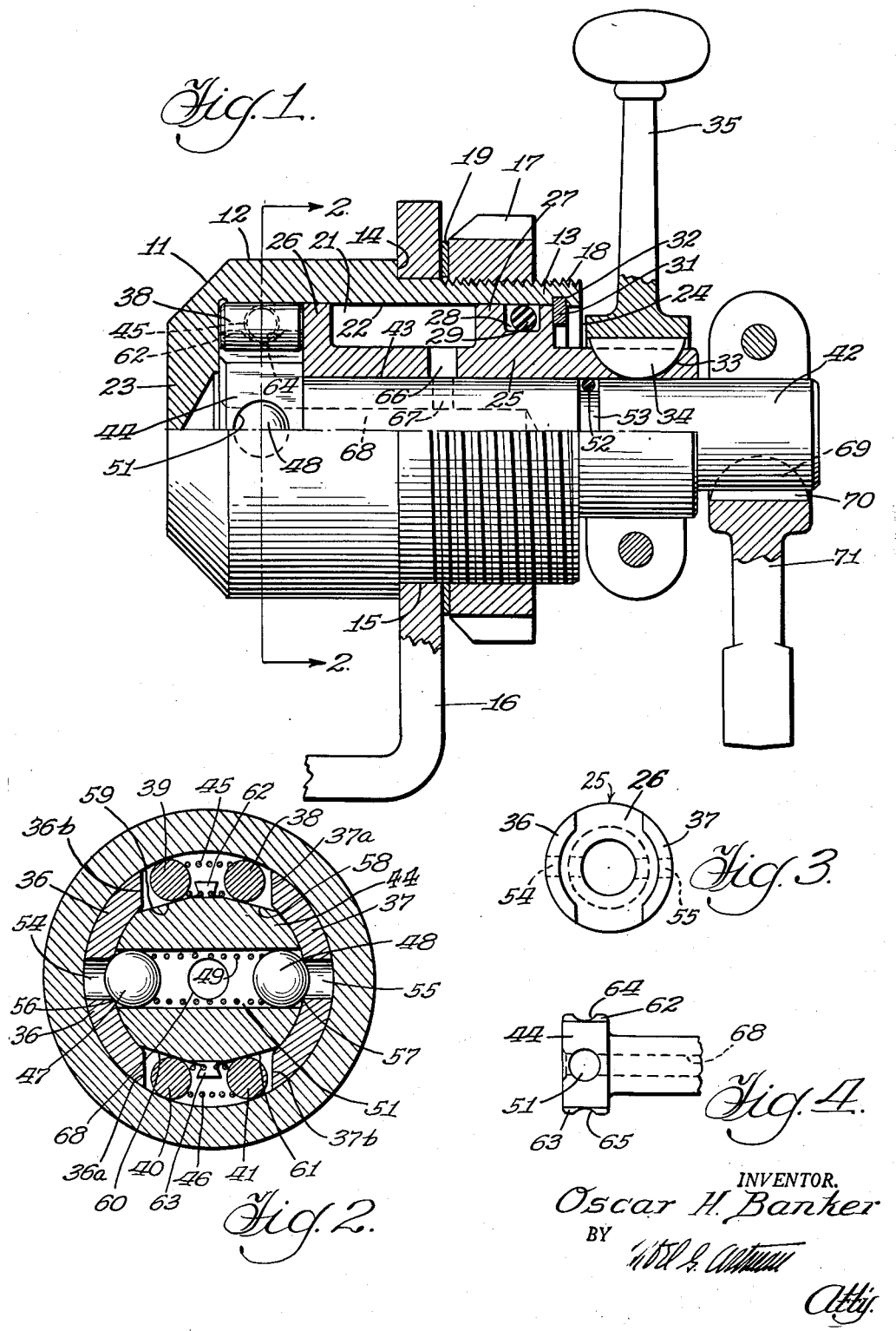
March 2, 1954
O. H. BANKER
2,670,824
ADJUSTMENT MOTION TRANSMITTING AND RETAINING DEVICE
Filed March 29, 1950
INVENTOR.
Oscar H. Banker Patented Mar. 2, 1954

UNITED STATES PATENT OFFICE 2,670,824

ADJUSTMENT MOTION TRANSMITTING AND RETAINING DEVICE

Oscar H. Banker, Evanston, Ill., assignor to New Products Corporation, Chicago, Ill., a corporation of Delaware Application March 29, 1950, Serial No. 152,696

2 Claims. (Cl. 192—8)

This invention relates to adjustment motion transmitting and retaining devices particularly of the character utilizable between a manually operated control member and a part to be manually adjusted by force applied to the control member, and the device being operable to preclude movement of said part excepting by force transmitted from the control member.

An important object of this invention is the provision of a device of the aforesaid character employing a cup-like casing adapted to receive a lubricating substance together with concentric driving and driven structures inserted through the open end of such casing, the driven structure being the inner one of the concentric structures and being releasably lockable to the interior of the casing by releasable brake means adapted to be released by means rockable with the outer of such structures to facilitate rocking of the inner structure by force received from the outer structure.

A further object is the provision in a device according to the preceding object of sealing means between the outer structure and the casing and between the driving and driven structures to prevent egress of the lubricating substance outwardly through the cup-like casing opening.

A still further object is the provision of an adjustment motion transmitting and retaining device consisting of a relatively small number of sturdy economically produced and readily assemblable parts.

Another object is the provision of a device according to any of the preceding objects wherein the cup-like casing is mountable in selective rotative positions upon a mounting bracket or the like.

Another object is the provision of a device of the aforesaid character having driving and driven parts independently and relatively rotatively adjustable in the cup-like casing to attain desired angular relation of such members and to carry brake rollers into an unused circular braking surface cooperable therewith in the casing.

These and other desirable objects inherent in and encompassed by the invention will be more readily comprehended from the ensuing description, the appended claims and the annexed drawings, wherein:

Fig. 1 is a side view of the device showing the lower half in elevation and the upper half in section and with other parts partly in section for clarity.

Fig. 2 is a transverse sectional view taken on the line 2—2 of Fig. 1.

Fig. 3 is an end view of the driving structure in the device of Fig. 1, looking at the left end thereof as this structure is oriented in Fig. 1.

Fig. 4 is a fragmentary side elevational view of the left end of the driven structure of the device as it appears in Fig. 1.

Referring now to the drawings and particularly to Figs. 1 and 2, a casing 11 of the device has a cylindrical outer periphery divided into a large diameter section 12 separated by a smaller diameter section 13 by a shoulder 14. The smaller diameter portion 13 is slidable through an opening 15 in a mounting bracket 16 after which a retaining nut 17 is turned onto a threaded section 18 of the small diameter portion for pulling the shoulder 14 tightly against one face of the bracket while the nut presses a washer 19 firmly against the opposite side of the bracket.

A chamber 21 within the casing is bounded by a cylindrical inner periphery 22 of the casing. This chamber is closed at one end by an end wall 23 of the casing and is open at the opposite end 24 of the casing.

A driving structure 25 of generally tubular formation is disposed coaxially in the chamber 21 for oscillative movement therein. This driving structure has a circumferential radially outwardly projecting flange 26 on its inner end and a radially outwardly projecting flange 27 adjacently to its opposite end. Flange 27 is circumscribed by an annular groove 28 for receiving sealing means in the form of an O-ring 29 which reacts between the circular bottom of the groove 29 and an opposed cylindrical peripheral portion of the cylindrical chamber 21 in the casing. A snap ring 31 is seatable within a groove 32 extending about the cylindrical wall of the chamber for preventing movement of the driving structure 25 endwise outwardly through the open end 24 of the chamber. An outer end portion of the driving structure is axially slotted at 33 for receiving a key 34 which constrains the driving structure for rocking motion with a hand-operated control lever 35. A pair of semi-circular flanges 36 and 37 project axially from the flange 26 at the inner end of the structure 25, these flanges 36 and 37 constituting brake releasing means for releasing brake means which includes cylindrical rollers 38, 39, 40 and 41.

Prior to assembly of the snap ring 31 with the casing and prior to telescopic insertion of the driving structure 25 into the cylindrical chamber 21, a driven structure in the form of a shaft 42 was inserted telescopically into the bore 43 of the driving structure 25 to place a cam head 44 against the inner end of the driving structure. Thereafter the assembled structures 25 and 42—44 are inserted through the open end 24 of the chamber together with the brake rollers 38, 39, 40 and 41 and helical compression springs 45 and 46 disposed compressively between the rollers 38—39 and 40—41. Detent balls 47 and 48 together with a helical compression spring 49 acting reactively therebetween are also assembled within a diametric bore 51 in the cam head 44 prior to insertion of the sub-assembly parts through the chamber open end 24. A small O-ring 52 of synthetic rubber is disposed within a circumscribing groove 53 of the driven structure 42 to effect an oil seal between the parts 42 and 25. After the parts are assembled as illustrated in Fig. 1 the detent balls 47 and 48 register with diametrically opposite holes 54 and 55 in the flanges 36 and 37 which provide annular seats 56 and 57 for these detent balls.

Cam head 44 has a pair of substantially planar profiles 58 and 59 which converge in opposite directions onto the cylindrical inner periphery of the chamber engaged by the brake rollers 38 and 39 whereby the spring 45 in urging these rollers apart causes them to wedge between the profiles 58—59 and the circular wall of the casing chamber opposed thereto radially of the device. The spring 46 causes a like wedging action of the rollers 40 and 41 between planar profiles 60 and 61 at the opposite side of the cam head. The cam head has a radial projection 62 between the profiles 58 and 59 and a similar projection 63 between the profiles 60 and 61. These profiles 62 and 63 have arcuate cut-away sections 64 and 65 shown in Fig. 4 to accommodate the springs 45 and 46.

Dispersal of a flowable lubricant substance within the chamber is facilitated by radial bores 66 in the rockable driving structure 25, radial bores 67 in the rockable driven structure 42 which respectively register with the bores 66, and an axial recess 68 communicating between the radially inner end of the bores 67 and the inner end of the rockable structure 42. An outer end portion of the driven rockable structure contains an axial slot 69 to accommodate a key 70 which constrains a driven arm 71 for rotation with such rockable structure.

Operation of the device

The device is illustrated in the drawings with the driven structure 25 and the force transmitting arm 71 upon its outer end locked to the casing 11 by the releasable brake means including the rollers 38—39—40—41. Spring 45 urges the rollers 38—39 apart into wedging relation between the diverging planar cam profiles 58—59 and the portion of the cylindrical interior 22 of the casing engaging the diametrically opposite parts of these rollers engaged by said profiles. The rollers 40—41 react similarly between the cam profiles 60—61 and the opposed cylindrical part of the casing. As the parts are viewed in Fig. 2 counter-clockwise rotation of the driven structure including the cam head 44 is prevented by complemental action of the rollers 38 and 40 tending to become more tightly wedged between the profiles 58—60 and the part of the cylindrical casing periphery engaging the diametric opposite sides of the rollers 38 and 40. Clockwise rotation of the driven structure is prevented by the brake rollers 39—41 tending to become more tightly wedged between the profiles 59—61 and the opposed portions of the cylindrical interior of the casing. Springs 45 and 46 retain the brake rollers in a firmly wedged condition at all times when the brake means of which they are constituents is in the unreleased condition illustrated. Consequently the driven structure 42—44 is tightly held and prevented from minute movement in either rotative direction. Inasmuch as the casing 11 is rigidly mounted in the bracket 16, any adjustable mechanism such as the governor component of a constant speed throttle control for an internal combustion engine can be maintained in a fixed preselected setting. No drift from the setting because of vibration of the engine or parts including the bracket 16 connected therewith will disturb the setting of the arm 71 in the position it is held by the brake rollers of the present device.

When it is desired to change the position of the arm 71 to change the setting of any mechanism controlled thereby it is only necessary to impart a rocking motion to the manually operated control lever 35 in either direction and a corresponding rocking motion will be imparted to the arm 71. Assuming that the control lever 35 is rocked in a direction to cause counter-clockwise movement of the flange 26 and the brake releasing means in the form of the flanges 36—37 in Fig. 2, the seats 56 and 57 will first react against the detent balls 47—48 to displace them slightly toward one another incident to compressing the helical expansion spring 49. Pursuant to this initial counter-clockwise movement of the flanges 36—37 the flange end face 37a will be carried into engagement with the brake roller 38 simultaneously with the flange end face 36a contacting the brake roller 40. Pressure from the faces 36a—37a on the rollers 40—38 will unseat these rollers from their wedged position against the cam profiles 60—58 and displace these rollers against the projections 63—62 so that continued counter-clockwise movement of the driving structure 25 with the control handle 35 will impart counter-clockwise rocking motion through the projections 62—63 to the cam head 44 thereby causing counter-clockwise rocking of the driven structure 42 and of the arm 71 for effecting desired adjustment of any adjustable part with which the arm is connected. During this counter-clockwise rocking of the cam head 44 the cam profiles 59—61 tend to retract from the rollers 39—41 so that these rollers perform no wedging action trammeling such counter-clockwise rocking. When the adjustment is complete the operator will release the lever 35 whereupon the springs 45—46—49 impart an initial restorative clockwise rotation to the brake releasing flanges 36—37 until the rollers 38—40 regain their wedged position whereupon force components applied by the detent balls 47—48 upon the seats 56—57 complete the counter-clockwise restorative motion of the flanges 36—37 to the position illustrated in Fig. 2. The wedged rollers 38—39—40—41 then retain the driven structure locked in the new position.

When the control lever is rocked in the opposite direction the flange faces 36b—37b will be forced against the rollers 39—41 to release these rollers and press them against the projections 62—63 so that rocking motion is transmitted to the cam head 44 for rocking the driven structure 42 and the arm 71 clockwise as the parts are viewed in Fig. 2. During this clockwise rocking of the cam head 44 the cam profiles 58—60 are moved retractively with respect to the rollers 38—40 so that these rollers do not interfere with the rocking movement. When the desired adjustment is made and manual force is withdrawn from the lever 35 the springs 45—46 impart force through the rollers 39—41 against the flange faces 36b—37b for supplementing the spring-pressed detent balls 47—48 rotating the flanges 36—37 counter-clockwise toward the position shown in Fig. 2 relatively to the cam head. The final restorative counter-clockwise motion of the flanges 36—37 is caused by pressure of the detent balls upon the seats 56—57 for bringing these seats into coaxial relation with the bore 51. Again the brake rollers will become effective as described above for preventing rotation of the driven structure relatively to the casing 11 so that the rigidly held arm 71 is effective for maintaining the adjusted position of any adjustable part connected with said arm.

An examination of the individual parts of this device will reveal that they are very sturdy and at the same time of a shape adapting them to be economically produced by mass production methods. The casing 11 for example can be formed from a piece of bar stock by means of proper tools operated by an automatic screw machine. The driving structure 25 can be turned on an automatic lathe from a piece of stock tubing after which the semi-circular flanges 37 can be formed from an initially continuous flange by a slotting machine which cuts away material for forming the end faces 36a—36b—37a—37b. The driven structure 42a can also be formed from bar stock by an automatic lathe after which the flat cam profiles 58—59—60—61 can be formed by a broaching operation. The nut 17, brake rollers, detent balls, the helical springs, the O-rings and the snap ring 31 are all mass-produced standard parts.

Manual motions for assembling the parts are minimized because of the small number thereof. The driving and driven structures are assembled coaxially together with the O-rings 29 and 52 prior to insertion together with the brake rollers and the detent balls into the cylindrical chamber 21 after which the parts are held in assembly by the single operation of inserting the snap ring 31 into the groove 32. Since the left end of the casing 11 is integral with the cup-like casing no leakage of lubricating grease or oil can occur at this end of the device and the inexpensive O-rings 29 and 52 have proven to be admirably effective for preventing lubricant leakage along the surface of the coaxially assembled parts through the open end of the chamber 21.

In addition to the device employing a minimized number of parts constituting a sealed permanently lubricated device, these parts are inherently sturdy to avoid deterioration though subjected to severe vibration in some installations.

Having thus described a single preferred embodiment of the invention with the view of clearly and concisely illustrating the same, I claim:

1. In an adjustment motion transmitting and retaining device, a casing having a cylindrical chamber closed at one end and open at the other end, a tubular driving structure rockable coaxially in said chamber, said structure having an inner end spaced axially from the closed end of the chamber, a driven structure rockable coaxially in the driving structure and having an inner end portion adjacently to the closed end of said chamber, releasable brake means disposed in the space between the inner end of the driving structure and the closed end of the chamber and operable when unreleased to establish a braking connection between the casing and the driven structure to prevent rocking of the latter in either direction relatively to the casing, brake releasing means constrained for rocking with the driving structure and operable responsively to rocking of such structure to release said brake means and consequently the driven structure to facilitate rocking of the driven structure in the direction the driving structure is rocked to cause such release, means for transmitting rocking motion from the driving structure to the released driven structure, said braking means being adapted to re-establish its braking connection between the casing and the driven structure pursuant to termination of rocking force applied to the driving structure, said chamber being sufficiently commodious to contain a lubricating substance in addition to said structures, sealing means between the driving structure and an inner circumferential peripheral portion of the chamber to preclude egress of the lubricant substance between the driving structure and such peripheral portion of the chamber, and a second sealing means between an inner circumferential peripheral portion of the tubular structure and the driven structure to preclude egress of the lubricant substance from the chamber between said structures.

2. In an adjustment motion transmitting and retaining device, a casing having a cylindrical inner periphery forming a chamber and an end opening coaxially with such periphery, a tubular driving structure having inner and outer ends and a circumferential groove in its exterior periphery between such ends, said tubular driving structure being inserted endwise into the cylindrical periphery of the chamber in journalled relation therewith to facilitate rocking of said structure in the chamber, the inner end of the tubular structure being spaced from the inner end of the cylindrical periphery and the circumferential groove in the exterior periphery of said structure cooperating with the casing to form a lubricant receiving space, an outer end portion of said structure projecting axially outwardly from the casing and facilitating the attachment thereto of a manual rocking lever, a driven structure journalled in the tubular driving structure and having an inner end portion projecting inwardly of the casing beyond the inner end of the driving structure and having an outer end portion projecting outwardly of the casing beyond the outer end of the driving structure to facilitate connection therewith of a part to be adjusted, releasable brake means disposed in the cylindrical chamber between the inner end portion of the driven structure and the radially opposed cylindrical periphery of such chamber and operable when unreleased to establish a braking connection between the casing and the driven structure to prevent rocking of the latter in either direction relatively to the casing, brake releasing means constrained for rocking with the driving structure and operable responsively to rocking of such structure to release said brake means and consequently the driven structure to facilitate rocking of the driven structure in the direction the driving structure is rocked to cause such release, means for transmitting rocking motion from the driving structure to the released driven structure, said braking means being adapted to re-establish its braking connection between the casing and the driven structure pursuant to termination of rocking force applied to the driving structure, means mounted on the casing and reacting against an outer end portion of the driving structure to prevent accidental movement of said structures from the casing, said device having an annular channel coaxial with the casing cylindrical periphery and formed by a portion of such periphery and an opposed portion of the outer periphery of the driving structure, a second annular channel coaxial with and formed between the inner periphery of the tubular driving structure and the outer periphery of the driven structure, and sealer O-rings respectively in said annular channels to preclude ingress of abrasive foreign particles into the casing and to prevent egress of lubricant from said casing.

OSCAR H. BANKER.

References Cited in the file of this patent

UNITED STATES PATENTS

| Number | Name | Date |
|---|---|---|
| 1,015,861 | Warner | Jan. 30, 1912 |
| 1,654,748 | Nicholson | Jan. 3, 1928 |
| 1,684,341 | Bethel | Sept. 11, 1928 |
| 1,930,586 | Delaval-Crow | Oct. 17, 1933 |
| 2,066,167 | Swartz | Dec. 29, 1936 |
| 2,171,458 | Swartz | Aug. 29, 1939 |
| 2,258,307 | Vickers | Oct. 7, 1941 |
| 2,287,357 | Nyborg | June 23, 1942 |

FOREIGN PATENTS

| Number | Country | Date |
|---|---|---|
| 107,954 | Great Britain | July 19, 1917 |